(12) United States Patent
Minde et al.

(10) Patent No.: US 9,348,845 B2
(45) Date of Patent: May 24, 2016

(54) METHOD AND SYSTEM FOR VERIFYING GEOGRAPHICAL DESCRIPTIVENESS OF MEDIA FILE

(75) Inventors: Tor Bjorn Minde, Gammelstad (SE); Richard Carlsson, Stockholm (SE); Xin Feng, Nanjing (CN); Visa Fristrom, Helsinki (FI); David Hertz, Stockholm (SE); Rita Ziyi Xu, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 834 days.

(21) Appl. No.: 13/126,774

(22) PCT Filed: Oct. 31, 2008

(86) PCT No.: PCT/EP2008/064840
§ 371 (c)(1),
(2), (4) Date: Apr. 29, 2011

(87) PCT Pub. No.: WO2010/049008
PCT Pub. Date: May 6, 2010

(65) Prior Publication Data
US 2011/0208702 A1 Aug. 25, 2011

(51) Int. Cl.
*G06F 17/30* (2006.01)
(52) U.S. Cl.
CPC ............................. *G06F 17/30265* (2013.01)
(58) Field of Classification Search
USPC .......................................................... 707/687
See application file for complete search history.

(56) References Cited

U.S. PATENT DOCUMENTS

| | | | | |
|---|---|---|---|---|
| 6,285,393 B1* | 9/2001 | Shimoura et al. | ............. | 348/119 |
| 7,340,079 B2* | 3/2008 | Segawa | ............. | G06F 17/30265 340/5.53 |
| 7,456,872 B2* | 11/2008 | Rothschild | ........ | G06F 17/30265 348/231.99 |
| 7,978,207 B1* | 7/2011 | Herf et al. | ...................... | 345/619 |
| 8,131,118 B1* | 3/2012 | Jing et al. | ...................... | 382/305 |
| 8,144,920 B2* | 3/2012 | Kansal | .................... | G01C 21/20 382/100 |
| 8,238,693 B2* | 8/2012 | Nurminen | ......... | G06F 17/30265 382/286 |
| 8,275,394 B2* | 9/2012 | Mattila | ................. | G06F 3/0481 455/456.1 |
| 2004/0070678 A1 | 4/2004 | Toyama et al. | | |
| 2005/0144049 A1* | 6/2005 | Kuzunuki et al. | ................. | 705/6 |
| 2005/0265535 A1* | 12/2005 | Kanada | .................... | 379/202.01 |
| 2005/0289039 A1 | 12/2005 | Greak | | |
| 2007/0118509 A1 | 5/2007 | Svendsen | | |
| 2008/0226130 A1* | 9/2008 | Kansal et al. | ................. | 382/106 |
| 2010/0082612 A1* | 4/2010 | Duan et al. | ..................... | 707/724 |
| 2012/0011151 A1* | 1/2012 | Eichhorn | ...................... | 707/770 |

FOREIGN PATENT DOCUMENTS

WO      02/13065 A1    2/2002

* cited by examiner

*Primary Examiner* — Boris Gorney
*Assistant Examiner* — Bao Tran
(74) *Attorney, Agent, or Firm* — Patent Portfolio Builders, PLLC

(57) ABSTRACT

The invention relates to a system for verifying geographical descriptiveness of a media file, such as a picture. The system comprises storage means adapted to store a media file, communication means adapted to send said media file to a plurality of user terminals, and to receive, from the user terminals, data indicating a guessed geographical position with which the user of each user terminal associates the media file. The system also comprises calculation means adapted to determine whether the media file is indicative of a geographical position based on the guessed geographical positions received from the plurality of user terminal.

29 Claims, 7 Drawing Sheets

FIG. 3

18: Database Table MEDIA

| Media ID | Media name | Media type | Assigned position | Verification rating |
|---|---|---|---|---|
| ... | ... | ... | ... | ... |
| 324 | Stockholm Royal Palace | Audio | N 59°19'35.82" E 18°4'18.10" | 7,3 |

$P_a$    $\chi_{VR}$

19: Database Table GUESSED POSITIONS

| Media ID | Guess ID | Guessed position |
|---|---|---|
| ... | ... | ... |
| 324 | 112453 | N 59°19'34.81" E 18°4'18.35" |

21: Database Table USERS

| User ID | User name | User contact info | User score |
|---|---|---|---|
| ... | ... | ... | ... |
| 2146 | xxxxxxx | xxxxxxxxxxx | 211 |
| 1138 | xxxxxxxx | xxxxxxxxxx | 107 |

22: Database Table GUESS MADE BY

| Guess ID | User ID |
|---|---|
| ... | ... |
| 112453 | 2146 |

23: Database Table MEDIA UPLOADED BY

| Media ID | User ID |
|---|---|
| ... | ... |
| 324 | 1138 |

24: Database Table USER SESSION

| User ID | IP address |
|---|---|
| ... | ... |
| 2146 | xxxxxxxxxxx |

METHOD AND SYSTEM FOR VERIFYING GEOGRAPHICAL DESCRIPTIVENESS OF MEDIA FILE

TECHNICAL FIELD

The invention presented herein relates to the field of data acquisition, and in particular to a method and system for using acquired data to determine whether a media file is indicative of a geographical position or not.

BACKGROUND

Human computation, involving human responses in a computer system as part of the computation, is used for many different tasks for example in generating information from online game data.

A game called the ESP game has been created where images are tagged with information by players of an image description guessing game. The game makes it possible to tag images through the Google Image Labeler game.

Using humans to add information about things that machines don't understand has been proven to be very powerful. The ESP game follow up, Peekaboom, was played by 27,000 people in the first 4 months, generating 2,100,000 pieces of data.

The feature of labelling media, for example pictures, with a position is used in many applications like Flickr, Panoramio, etc. The other way around, labeling of positions with media, is not a well used concept. However, media files being descriptive of geographical positions are believed to be highly demanded in the future, for example for use in online map applications, such as Google Earth. The media files that describe a certain location could then be presented to a user expressing an interest in that location, for example by indicating the location on the map.

Generating media files such as pictures, texts, audio and video clips that are descriptive of different geographical positions is time consuming. Therefore, it is desirable to involve the public in the process of generating such media. For example, the public may be encouraged to use their mobile phones to take photos that are descriptive of a geographical position, and upload the pictures to a web server for use in, e.g., an online map application.

However, as is often the case when using user-generated material in applications, it is difficult to guarantee that the quality of the user-generated media files fulfils the requirements needed in order for the application to be truly useful and appreciated. Or, in other words, it is difficult to ensure that a user-generated media file is truly descriptive of a geographical position of which it is alleged to be descriptive by the user submitting it.

Thus, a problem associated with labeling of positions with media is how to determine whether a certain media file is truly descriptive of a geographical position.

SUMMARY

It is an object of the invention to provide a method and a system for determining whether a media file is indicative of a geographical position.

The invention relates to a method for verifying geographical descriptiveness of a media file, such as a picture. The method which for example may be performed by an application server to which a plurality of user terminals are capable of being connected comprises the steps of:

storing, in a first storage means, a media file;
sending said media file to a plurality of user terminals;
receiving, from each of said user terminals, data indicating a guessed geographical position with which the user of each user terminal associates said media file, and
determining whether said media file is indicative of a geographical position based on said data received from the plurality of user terminals.

A media file that is geographically descriptive should herein be interpreted as a media file that is descriptive of a geographical position. The terms "descriptive of a geographical position" and "indicative of a geographical position" are used synonymously throughout this document. That a media file is descriptive/indicative of a geographical position herein means that the media file is associable with that geographical position to at least some people. The term "plurality" is herein used for any number equal to or larger than two. The term "media file" should herein be interpreted as any digital information that can be visually and/or aurally presented to a user, such as pictures, drawings, audio clips, video clips, movies, texts, hyperlinks, maps etc. The terms "geographical position" and "location" are used synonymously throughout this document and should be interpreted as a point or an area on earth. Data that is indicative of a geographical position can be true coordinates in a geographic coordinate system, such as latitude, longitude and altitude coordinates, but may be any data indicating a point or an area on earth, or any data that can be transformed to data pointing out a point or an area on earth. An XY coordinate pair indicating a coordinate on a digital map, or a cell identification number identifying a cell in a telecommunications network in which the geographical positions of the radio base stations are known are hence also examples of data that is indicative of a geographical position.

The proposed method uses a plurality of guesses as to which geographical position a media file is associated with in order to determine whether the media file is truly or sufficiently accurately indicative of a geographical position. There are many different ways in which a user may indicate a geographical position with which he/she associates a media file. For example, the user can mark the position on a map that is displayed on his/her user terminal, or, if the user terminal is a mobile communication device, such as a mobile phone, the user can indicate the geographical position with which he/she associates the media file by bringing the user terminal to that position. If the user terminal comprises or is connectable to a GPS receiver that is able to calculate its own position based on data received from GPS satellites and/or differential GPS stations, the position of a user terminal and hence the guessed/selected geographical position of the media file can be transmitted to the verification system in form of geographical coordinates or data indicative of geographical coordinates provided by the GPS receiver. If not, the position of the user terminal may still be acquired by the verification system by obtaining data indicating which access point (e.g. which base station in a mobile communications network) the user terminal is connected to.

The method is advantageously used for filtering out media files that are found non-descriptive from a database storing media files intended for use in a media-labeled map application. The term media-labeled map application is herein used for an application allowing users to study a map in which various geographical positions, i.e. locations, are labeled with media files. Typically, the media files can be presented to the users to give them detailed information about a particular location of interest. Therefore, to make a media-labeled map application user-friendly, it is important that the media files are truly descriptive of the locations to which they are assigned.

A media-labeled map application typically requires a huge storage capacity due to the large number of media files that must be stored in order for the application to be useful. The proposed method renders possible identification of non-descriptive media files occupying valuable storage space, thus allowing these media files to be removed from the storage means so that the storage requirements of the system hosting the application is reduced.

The filtering-out of non-descriptive media files also reduces bandwidth requirements when the media-labeled map application is implemented as a network application since less media files need to be transmitted to the user terminals using the application.

According to an aspect of the invention, the media files stored in the storage means are uploaded by users. The media file may then be assigned a claimed geographical position of which the media file allegedly is indicative by the user uploading it, in which case the guesses from the plurality of users should correspond, at least to a certain degree, to this claimed position in order for the media file to be classified as geographically descriptive. However, a user may also upload a media file without assigning a claimed geographical position to it. If the media file is truly indicative of a geographical position, the guesses will point out the position.

The determination as to whether or not the media file is indicative of a geographical position may be based on the correspondence of the guessed geographical positions. The correspondence of the guessed geographical positions can be determined by comparing the guessed positions with each other, or by comparing each guessed position with an assigned position of the media file. As described above, such an assigned position of the media file may be a position that is given by a user uploading the media file but it may also be a position that is calculated based on some or all of the received guessed positions. According to an aspect of the invention wherein the determination is based on a comparison between the guessed positions and an assigned position of the media file, the assigned position is repeatedly recalculated based on the received guesses. For example, the assigned position of the media file can be repeatedly recalculated so as to always correspond to the average position of all received guessed positions for that media file.

According to an aspect of the invention, the determination involves calculation of a verification rating for each media file. Preferably, the calculation is performed such that media files are given a higher verification rating for each correct guess and such that a more precise guess results in a larger increase in rating than a less precise guess. The verification rating can thus be seen as a measurement of the geographical descriptiveness of the media file.

In order to obtain a large high-quality media database that can be used for, e.g., media-labeled map applications, it would be beneficial if a lot of users participate in the verification of the geographical descriptiveness of the media files and/or the generation and submission of new media files. There are several ways in which the public (i.e. potential users) can be encouraged to participate in these processes.

For example, a user that wants to gain access to an online service or website may be asked to guess the location for some media files before being granted access to the service or site. Or, the public may be encouraged to participate by announcing an online guess-the-location competition offering competitors tempting rewards by guessing the locations associated with media files presented to them.

Yet another possibility to get the public to generate and submit descriptive media files and/or to verify the geographical descriptiveness of media files by guessing, is to invite them to play a game utilizing the proposed method. In an exemplary implementation of such a game users compete against each other by uploading media files from their user terminals and/or by trying to guess the locations associated with media files uploaded by other users. By implementing the proposed method as a game, the public can be made to (automatically) generate a database holding only high-quality media files which all are truly descriptive of a geographical position while having fun. The game itself is hence a verification tool utilizing the proposed method for verifying geographical descriptiveness of media files.

A database holding geographically descriptive media files is not only useful for media-labeled map applications. Media files that are descriptive of geographical positions man be beneficially used in various applications. For example, real estate firms listing available objects on their websites may use such a database to give potential buyers more detailed information about the surroundings of an object of interest. This may be achieved by querying the database to retrieve all media files that are descriptive of locations in the immediate surroundings of the object of interest, and presenting those media files to the potential buyer.

The proposed method may be used also for other purposes than obtaining a large database of geographically descriptive media files. For example, it can be beneficially used in an online where-is-this-photo-taken application in which a user can upload a photo to a web server and ask visitors of a website to guess the geographical origin of the photo. Based on the correspondence of the acquired guesses one would be able to say that the photo is taken at a particular location with a certain degree of certainty.

The invention also relates to a system for verifying geographical descriptiveness of a media file, such as a picture. The system comprises storage means adapted to store a media file;

communication means adapted to send the media file to a plurality of user terminals, and to receive, from each of said user terminals, data indicating a guessed geographical position with which the user of each user terminal associates the media file, and calculation means adapted to determine whether said media file is indicative of a geographical position based on the guessed geographical positions.

Typically, the system includes an application server comprising a memory storing the media file(s), a database in which the acquired data is structured, and a computer program which performs and/or instructs the system components to perform the above-described actions when executed by a processor in the server. Such an application server can hence be seen as a verification server for verifying the geographical descriptiveness of the media files stored therein.

The system may, however, be a distributed system wherein the functionality needed to perform the required actions resides in different communicatively connected components, such as two or more different web servers forming a server cluster.

The invention also relates to a computer program product comprising computer readable code which, when executed by a processor in a system comprising storage means storing at least one media file and communication means through which said system can communicate with user terminals connected thereto, causes the communication means to send the media file to a plurality of user terminals, and to receive, from each of the user terminals, data indicating a guessed geographical position with which the user of each user terminal associates said media file, and to determine whether the media file is indicative of a geographical position based on the guessed geographical positions.

BRIEF DESCRIPTION OF THE DRAWINGS

The invention will become more fully understood from the detailed description provided hereinafter and the accompanying drawings which are given by way of illustration only. In the different drawings, same reference numerals correspond to the same element.

FIG. 3 illustrates some exemplary database tables which may be used in a database of the verification system illustrated in FIG. 2;

FIG. 7 illustrates some more exemplary database tables which may be used in the database of the verification system illustrated in FIG. 2.

DETAILED DESCRIPTION

Figure 1:
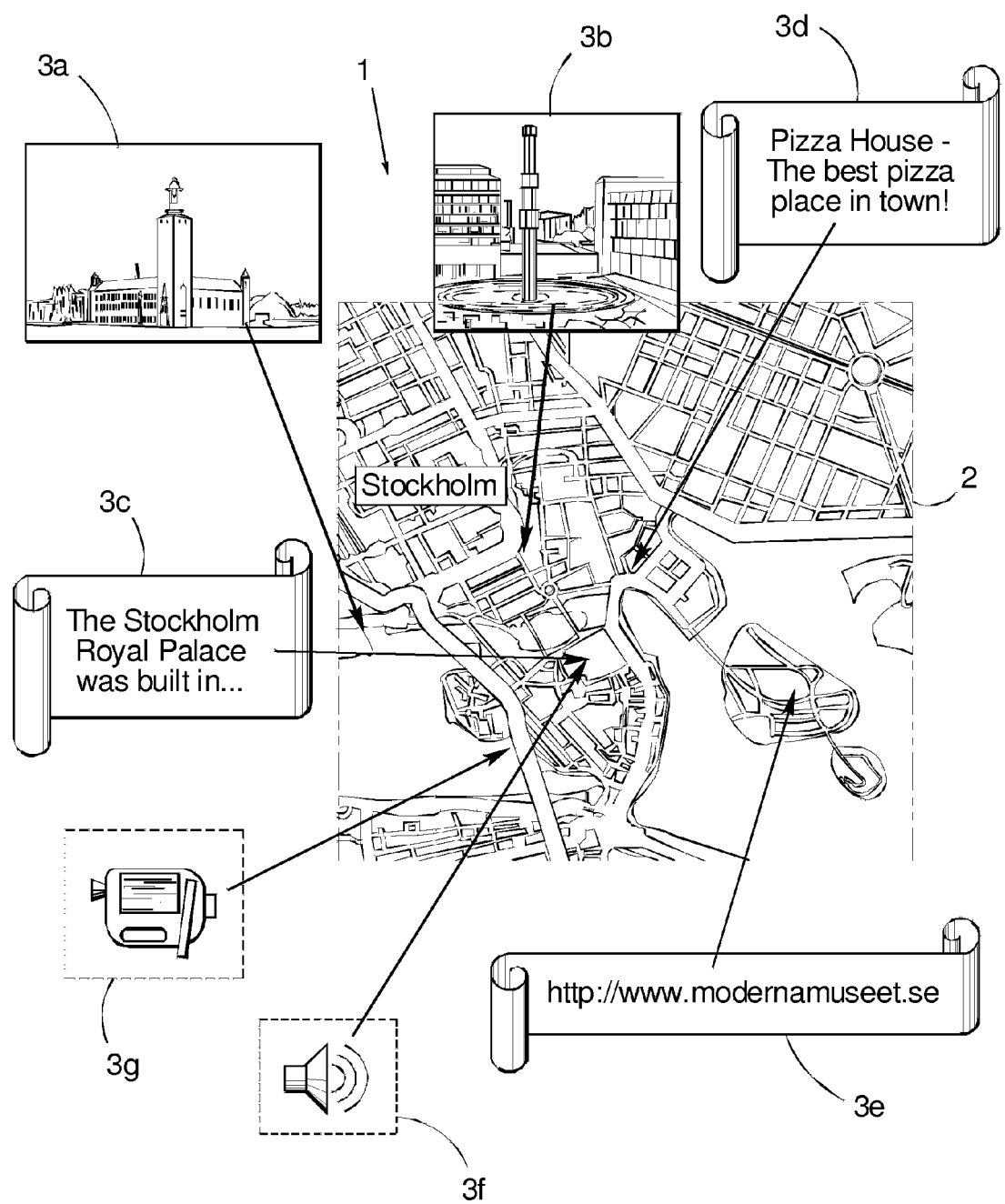
FIG. 1 illustrates a schematic user interface of what is herein referred to as a media-labeled map application.

FIG. 1 illustrates a schematic user interface 1 of an exemplary application that would benefit from the invention presented in this document. The application is a web-based map application allowing users to study a map in which various geographical positions, i.e. locations, are labeled with media files. The media files should be descriptive of the locations to which they are labeled and can be presented to the users to give them detailed information about a particular location of interest. A map application in which geographical positions may be labeled with media files descriptive thereof will hereinafter be referred to as a media-labeled map application.

The map 2 is intended to illustrate the city centre of Stockholm, Sweden. It should be understood that the map 2 is not necessarily realistic and into scale and is only used herein for facilitating description of a media-labeled map application.

Various media files 3 are seen to be presented to the user to give him/her detailed information about certain locations in the map. The media files 3 may be photos 3a-3b, texts 3c-3e, audio clips 3f, video clips 3e or any other media that is descriptive of a geographical position.

That a media file is descriptive of a geographical position should herein not necessarily be interpreted as if the media file really describes a certain geographical position but rather that the media file somehow is indicative of a geographical position. That a media file is descriptive/indicative of a geographical position herein means that the media file is associable with that geographical position to at least some people. For example, the audio clip 3f in e.g. MP3 format may be a speech recording telling the history of the Stockholm Royal Palace. Although not really describing the geographical position of the Stockholm Royal Palace, at least some people would associate the audio clip with the location at which the palace is situated. Therefore, according to the terminology used in this document, the audio clip would be said to be descriptive of that location/geographical position.

In order for a media-labeled map application to be user-friendly, it is important that the media files are truly or sufficiently accurately descriptive of the geographical positions to which they are assigned. Non-descriptive media files or media files descriptive of another location than the location to which they are assigned will only cause irritation among application users and occupy valuable space in the computer storage medium used to store all media files. Therefore, before using a media file in a media-labeled map application, or any other application in which there is a desire to use media files that are indicative of geographical positions, it is desirable to determine whether it is truly or sufficiently accurately descriptive of a geographical position.

Figure 2:
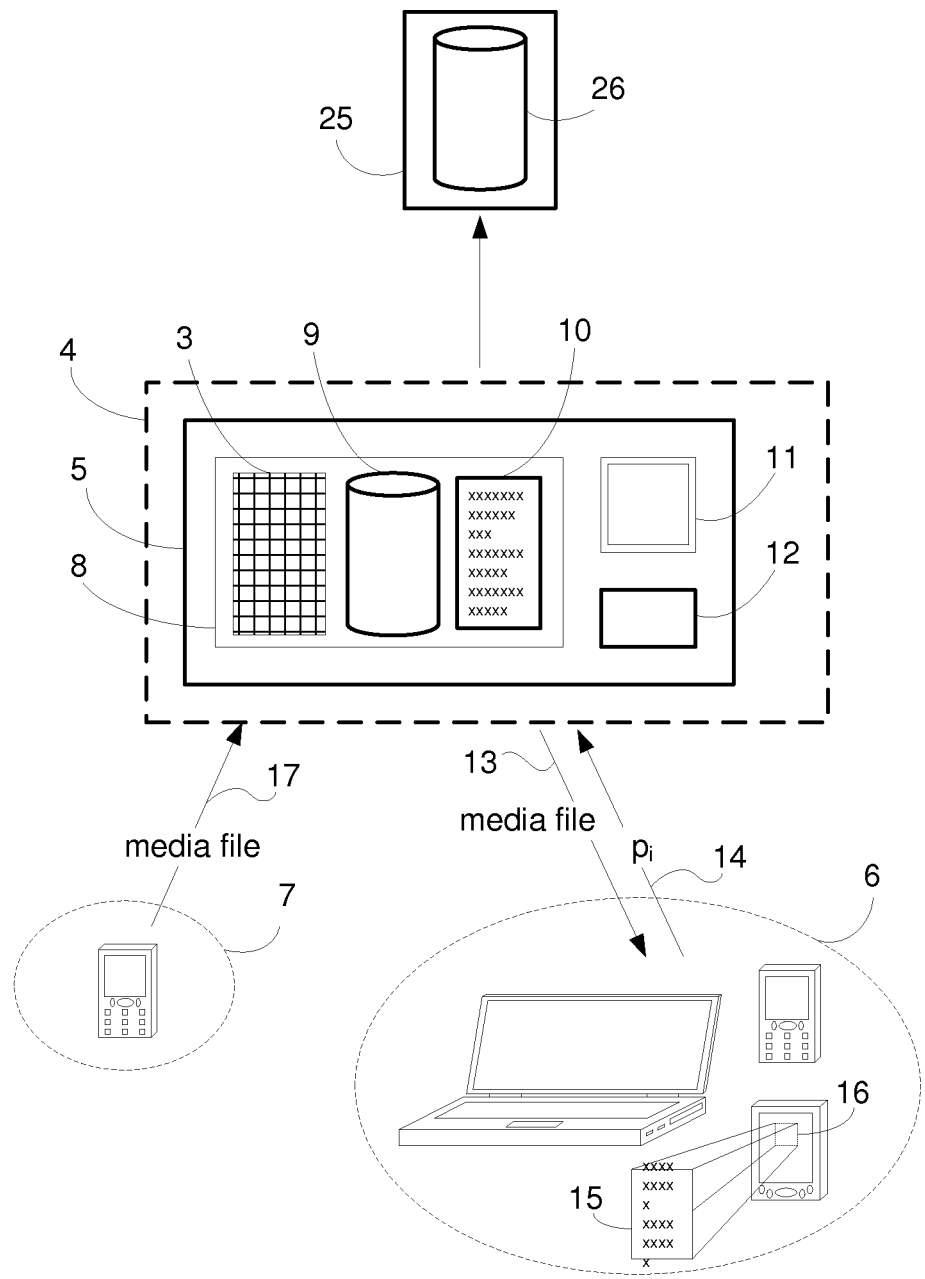
FIG. 2 illustrates an exemplary embodiment of a system for verifying the geographical descriptiveness of a media file.

FIG. 2 illustrates an exemplary embodiment of a system 4 for verifying the geographical descriptiveness of a media file according to the invention. In this embodiment, the verification system 4 comprises a server 5 to which a plurality of user terminals 6, 7 are communicatively connected. That a user terminal is communicatively connected to the server 5 herein means that the user terminal and the server are connected to each other, either directly or indirectly, in a way that allows them to exchange information.

The server 5 comprises storage means 8 for storing one or several media files 3, a database 9 and computer program code 10. The storage means 8 may be any computer storage medium known in the art, for example a conventional hard disc drive. The server 5 also comprises processing means 11, such as a conventional micro processor, for executing the computer program code 10 stored in the storage means 8, and communication means 12 allowing the server 5 to communicate with the user terminals 6, 7 and possibly also other nodes which may or may not form a part of the verification system 4. The communication means 8 may be any communication means adapted for wired or wireless transmission and reception of data, such as a network module (e.g. an Ethernet module), a bluetooth transceiver module or an infrared (IR) transceiver module.

The server 5 may be located in a node in any type of network through which it can communicate with user terminals 6, 7. Typically, the server 5 is located in or connected to a global interconnecting network, such as the Internet, to which the user terminals 6, 7 may connect, e.g. via an Ethernet connection or an IEEE 802.11 standard or via some "long range" telecommunications network, such as a GSM network with GPRS, a UMTS network, an LTE/SAE network, a WiMAX network or the like. Although illustrated as a single server 5 in this exemplary embodiment, it should be appreciated that the verification system 4 also may be a distributed system whose functionality resides in different communicatively connected nodes, such as two or more web servers in a cluster which in a network architecture can be considered as a single node.

Media files 3 can be uploaded to the verification system 4 from any conceivable source. For example, media files 3 can be uploaded by user terminals 6, as indicated by the arrow 17, or uploaded from, e.g., a web server (not shown) hosted by an administrator who wants to verify the geographical descriptiveness of the media files stored therein. In order to verify whether a stored media file 3 is descriptive of a geographical position, the verification system 4 is adapted to send that media file 3 to a plurality of user terminals 6 as illustrated by the arrow 13, and to receive, from each user terminal 6, data indicating a geographical position $p_i$ with which the user of each user terminal 6 associates the media file, as illustrated by the arrow 14. The geographical positions $p_i$ with which the users associate the media file may for example be indicated by the users by marking a position on a digital map which is presented to them on their user terminals 6. The geographical positions with which the users associate a media file that is sent to them for verification of its geographical descriptiveness is hereinafter referred to as guessed geographical positions $p_i$. The verification system 4 is further adapted to determine whether the media file is descriptive/indicative of a geographical position based on the guessed geographical positions $p_i$ received from the plurality of user terminals 6.

The logic for carrying out this verification procedure is realized by means of software, herein represented by the computer program code 10. The computer program code 10 is a server-side application which performs and/or instructs the components of the verification system 4 to perform the above described actions when executed by the processing means 11. The user terminals 6, 7 in turn interact with the verification system 4 through a client-side application 15 stored on a storage medium 16, such as a Flash memory or a ROM (Read-Only Memory), in the user terminals (only shown for one of the user terminals for the purpose of illustration). For example, the server-side application 10 may be implemented in Java and the client-side application 15 in Java ME (Micro Edition). In this exemplary embodiment, the verification server 5 comprises a web server communicating with the user terminals 6, 7 using the Hypertext Transfer Protocol (HTTP) as well known in the art. The server-side application 10 and the client-side application 15 may, according to an aspect of the invention, be separately manufactured and distributed as computer program products comprising the computer program code 10 and 15, respectively, allowing the server-side application and the client-side application to be run when executed by processors. The computer program products carrying the program code 10 and 15, respectively, for running the applications may be any digital storage medium, such as a CD ROM, DVD, a Flash memory in the form of a memory card, or the like. It may also be, e.g., a hard disk drive on a server device comprising the web server that allows the code 10, 15 for running the applications to be downloaded by connecting to the web server. Thus, the storage means 8 of the verification system 4 comprising the computer code 10, and the storage means 16 of the user terminals 6, 7 comprising the computer code 15, can both be considered as such computer program products.

The database 9 may be any type of database in which information can be stored in a structured way, such as an SQL database. FIG. 3 shows an example of some database tables 18, 19 that may be used in the database 9. Database table 18 is named MEDIA and stores one data record (i.e. one row) for each media file 3 stored in the storage means 8. Here it is seen that for each media file 3, the database table 18 stores an identification number (Media ID), a name (Media name), data (Media type) identifying the media type of the media file, data (Assigned position) indicating a position $P_a$ to which the media file currently is assigned, and data (Verification rating) indicating a verification rating $\chi_{VR}$ which is a measure of the geographical descriptiveness of the media file. The meaning and purpose of the parameters named assigned position $P_a$ and verification rating $\chi_{VR}$ will be discussed in more detail below. From FIG. 3 it is also seen that a second database table 19 named GUESSED POSITIONS is used to store the guessed geographical positions $p_i$ received from various user terminals 6. For each guessed geographical position $p_i$ received by the verification system 4, the database table 19 stores an identification number of the guess (Guess ID), data (Guessed position) indicating the guessed geographical position $p_i$, and the identification number (Media ID) of the media file to which the guess relates.

As mentioned above, the verification system 4 is adapted to determine whether a media file 3 is descriptive/indicative of a geographical position based on the guessed geographical positions $p_i$ received from the plurality of user terminals 6. According to an aspect of the invention, this determination is performed by calculating a verification rating $\chi_{VR}$ of the media file and classifying the media file as descriptive if the verification rating $\chi_{VR}$ exceeds a predetermined threshold value. This verification rating parameter $\chi_{VR}$ is the parameter stored in the right-most column in database table 18 in FIG. 3. As will be described below, the verification rating $\chi_{VR}$ of a media file 3 is calculated based on the correspondence of the guessed geographical positions $p_i$ for that media file. In the exemplary embodiment illustrated in FIG. 2, the verification ratings $\chi_{VR}$ of the media files 3 are calculated by the processing means 11 of the verification system 4 in accordance with algorithms given by the server-side application 10.

According to one embodiment of the invention, the verification rating $\chi_{VR}$ is calculated by comparing all guessed geographical positions $p_i$ with each other. For example, the verification rating $\chi_{VR}$ of a media file can be calculated as a value that is proportional to the inverse of the variance of all guessed geographical positions $p_i$ for that media file. By doing so, the verification rating $\chi_{VR}$ becomes high if the variance of the guessed geographical positions $p_i$ is low, and low if the variance of the guessed geographical positions $p_i$ is high. Of course, other measures of statistical dispersion than variance can be used in a similar way for calculating a verification rating $\chi_{VR}$ that is indicative of the correspondence of the guessed geographical positions $p_i$ for a media file.

According to another embodiment of the invention, the verification rating $\chi_{VR}$ of a media file is calculated by comparing each received guessed position $p_i$ with an assigned geographical position $P_a$ of the media file. The assigned position $P_a$ is the parameter stored in the second right-most column in database table 18 in FIG. 3.

For example, the assigned position $P_a$ of a media file can be used to calculate the verification rating $\chi_{VR}$ of the media file by performing the following steps:

Step 1) Set the initial verification rating $\chi_{VR}$ value of a media file to zero.

Step 2) For each received guessed geographical position $p_i$ received from a user terminal 6 and relating to that particular media file, calculate the geographical (Euclidean) distance between the assigned geographical position $P_a$ of the media file and the guessed position $p_i$. If the distance exceeds a maximum distance threshold value $d_{max}$, classify the guess as incorrect and leave the verification rating $\chi_{VR}$ unaffected. If, on the other hand, the calculated distance between the assigned geographical position $P_a$ and the guessed geographical position $p_i$ is shorter than the maximum distance threshold value $d_{max}$, then classify the guess as at least fairly correct and increase the verification rating $\chi_{VR}$ with a number equal to 1 minus the distance between the guessed position $p_i$ and the assigned position $P_a$, divided by the maximum distance threshold value $d_{max}$.

This exemplary procedure of updating/recalculating the verification rating based on received guessed positions $p_i$ and an assigned position $P_a$ of a media file can hence be summarized as follows:

$$\text{if } |P_a - p_i| > d_{max} \Rightarrow \chi_{VR}(\text{updated}) = \chi_{VR}, \text{ else}$$

-continued $$\chi_{VR}(\text{updated}) = \chi_{VR} + \left(1 - \left(\frac{|P_a - p_i|}{d_{max}}\right)\right),$$

where $P_a$ is the assigned geographical position of the media file, $p_i$ is the latest received guessed geographical position of the media file, $|P_a-p_i|$ is the geographical (Euclidean) distance between the point $P_a$ and the point $p_i$, $d_{max}$ is a threshold value for the maximum distance allowed between the assigned geographical position $P_a$ and the guessed geographical position $p_i$ in order for the guess to be classified as correct, $\chi_{VR}(\text{updated})$ is the new verification rating of the media file, and $\chi_{VR}$ is the verification rating of the media file prior to the reception of the latest received guessed geographical position $p_i$.

The assigned position $P_a$ of a media file may be a static, invariable parameter which is set once and for all for each media file. For example, the assigned position $P_a$ of a media file may be permanently set to a position that is stated by a user uploading the media file (e.g. by the user of user terminal 6 in FIG. 3), or to a position corresponding to, e.g., the first guessed position $p_i$ for that media file received from a user terminal 6 by the verification system 4. A position that is assigned to a media file by a user uploading it will hereinafter be referred to as a claimed position $P_c$ since the general idea in this case is that the uploading user should state a position of which he/she thinks (claims) the media file is indicative. The assigned position $P_a$ of a media file may hence be permanently set to such a claimed position $P_c$ or to a guessed position $p_i$ of the media file.

However, the assigned geographical position $P_a$ of a media file is preferably a variable parameter that is repeatedly recalculated based on the received guessed geographical positions $p_i$ of that media file. For example, the assigned position $P_a$ of a media file may initially be set to a claimed position $P_c$ stated by a user uploading the media file or to a position corresponding to the first guessed position $p_i$ received for that media file as described above, whereupon it is repeatedly recalculated so as to always correspond to an average geographical position $P_{av}$ of all received guessed geographical positions $p_i$. The average geographical position $P_{av}$ is the position P minimizing the sum $$\sum_{i=1}^{i=N} |P - p_i|,$$

$|P-p_i|$ is the geographical (Euclidean) distance between the point P and the point $p_i$ and N is the total number of guessed geographical positions $p_i$ for the media file. That is, the assigned position $P_a$ of a media file may be updated each time data indicating a guessed geographical position $p_i$ for that media file is received by the verification system 4.

To obtain a more accurate assigned position $P_a$ of a media file, i.e. to increase the probability that the assigned position $P_a$ is close to the position of which the media file is indicative, the assigned position $P_a$ of a media file can be calculated as the average position $P_{av}$ of all received guessed positions $p_i$ for that media file with outliers removed. Removing outliers here means that all guessed positions $p_i$ that are far away from the average position are removed. When this method is used the problem of extreme guesses (i.e. guessed positions $p_i$ that are far away from most of the other guessed positions) impacting the assigned position $P_a$ of a media file is avoided.

The method of calculating the assigned position $P_a$ of a media file as the average position with outliers removed can be performed by carrying out the following steps:

Step 1) Calculate the average geographical position $P_{av}$ of all guessed geographical positions $p_i$ for the media file according to above, i.e. by calculating the average position $P_{av}$ as the position P minimizing the sum $$\sum_{i=1}^{i=N} |P - p_i|.$$

Step 2) For each guessed geographical position $p_i$, calculate the distance from the guessed position $p_i$ to the average position $P_{av}$, and denote the distance $d_i$. That is, calculate the distance $d_i$ as:

$$d_i=|P_{av}-p_i|,$$

where $d_i$ is the geographical (Euclidean) distance between the point P and the point $p_i$.

Step 3) Find the longest calculated distance from the average position $P_{av}$, i.e. the $d_i$ having the highest value. Denote this value max_$d_i$ and denote the guessed position $p_i$ from which max_$d_i$ was calculated max_$p_i$.

Step 4) If max_$d_i$ exceeds a threshold value max_allowed_$d_i$ remove the position max_$p_i$ from the set of guessed geographical positions $p_i$ to calculate the average position $P_{av}$ from.

Step 5) Repeat step 1 through 4 until max_$d_i$ no longer exceeds the threshold value max_allowed_$d_i$, i.e. until max_$d_i$≤max_allowed_$d_i$.

Step 6) Set the assigned position $P_a$ of the media file equal to the average position $P_{av}$ calculated in step 1, thus making the assigned position $P_a$ equal to the average position of all guessed geographical positions $p_i$ with outliers removed.

The threshold value parameter max_allowed_$d_i$ thus indicates how far away from the average position $P_{av}$ a guessed position $p_i$ is allowed to be situated to be included in the calculation of the assigned position $P_a$ of the media file. For example, if the threshold value max_allowed_$d_i$ is set to 500 meters, no guessed position $p_i$ falling outside a circle having its center point at the average position $P_{av}$ and a radius of 500 meters will be included in the calculation of the assigned position $P_a$ In some situation it is important to consider the fact that the guessed positions $p_i$ of a media file will have a tendency to be grouped into clusters. For example, if a media file 3 is indicative of something that ⅓ of the users 6 think is a place in London and ⅔ of the users believe to be a place in New York, the average position $P_{av}$ of all guessed geographical positions $p_i$ will not be near either London or New York although one of them is probably "correct". To counter this problem, a method of calculating the assigned position $P_a$ of a media file comprising the step of removing all but one cluster of guessed positions $p_i$ from the set of guessed positions $p_i$ from which the average position $P_{av}$ is calculated can be used. According to this method, all guessed positions $p_i$ of a media file is divided into clusters and the average position $P_{av}$ is only calculated out of the guessed positions $p_i$ within the biggest cluster (i.e. the cluster having the largest number of guessed positions pi).

The method of calculating the assigned position $P_a$ of a media file as the average position with clusters removed can be performed by carrying out the following steps, of which the first three are equal to the first three steps in the above described method for calculating an average position with outliers removed:

Step 1) Calculate the average geographical position $P_{av}$ of all guessed geographical positions $p_i$ for the media file according to above, i.e. by calculating the average position $P_{av}$ as the position P minimizing the sum $$\sum_{i=1}^{i=N} |P - p_i|.$$

Step 2) For each guessed geographical position $p_i$, calculate the distance from the guessed position $p_i$ to the average position $P_{av}$, and denote the distance $d_i$. That is, calculate the distance $d_i$ as:

$$d_i = |P_{av} - p_i|,$$

where $d_i$ is the geographical (Euclidean) distance between the point P and the point $p_i$.

Step 3) Find the longest calculated distance from the average position $P_{av}$, i.e. the $d_i$ having the highest value. Denote this value max_$d_i$ and denote the guessed position $p_i$ from which max_$d_i$ was calculated max_$p_i$.

Step 4) If max_$d_i$ exceeds a threshold value max_allowed_$d_i$, find the shortest calculated distance from the average position $P_{av}$, i.e. the $d_i$ having the lowest value. Denote this value min_$d_i$ and denote the guessed position $p_i$ from which min_$d_i$ was calculated min_$p_i$. The threshold value parameter max_allowed_$d_i$ is the same parameter as used in the above described method.

Step 5) For all remaining guessed positions $p_i$, calculate the distance from that position $p_i$ to both max_$p_i$ and min_$p_i$. Then assign each position $p_i$ to either max_$p_i$ or min_$p_i$ depending on which distance is the shortest. That is, if a particular guessed position $p_i$ is 6000 meters away from max_$p_i$ and only 60 meters away from min_$p_i$, this particular guessed position $p_i$ is assigned to min_$p_i$.

Step 5) Count the number of guessed positions $p_i$ assigned to max_$p_i$ and min_$p_i$, respectively. Select the one with least number of positions assigned to it and remove all guessed positions $p_i$ assigned to that position (i.e. remove that cluster).

Step 6) Repeat step 1 through 5 with only the remaining guessed positions $p_i$ until max_$d_i$ no longer exceeds the threshold value max_allowed_$d_i$, i.e. until max_$d_i$≤max_allowed_$d_i$.

Step 7) Set the assigned position $P_a$ of the media file equal to the average position $P_{av}$ calculated in step 1, thus making the assigned position $P_a$ equal to the average position of all guessed geographical positions $p_i$ with outliers and clusters removed.

By repeatedly updating/recalculating the assigned position $P_a$ of a media file according to any of the methods for doing so described above, the assigned-position parameter $P_a$ will most likely, if the media file is truly or deemed sufficiently accurately indicative of a geographical position, converge towards that geographical position. Whether the repeatedly updated/recalculated assigned position $P_a$ of the media file is reliable or not is given by the verification rating $\chi_{VR}$. Thus, a high verification rating $\chi_{VR}$ of a media file indicates not only that the media file is geographically descriptive, but also that the assigned position $P_a$ of the media file points out the location of which the media file is descriptive. When repeatedly recalculated based on received guessed positions $p_i$, the assigned position $P_a$ of a media file will hence converge towards the "true" position of the media file. Therefore, when media files whose geographical descriptiveness have been verified are to be used in, e.g., a media-labeled map application, the media files are preferably assigned a map location given by their assigned-position parameters $P_a$. For example, the map location indicated by the arrow emanating from the image 3b in FIG. 1 is preferably a location corresponding to an assigned geographical position $P_a$ of the image 3b calculated by the verification system 4 in accordance with any of the above described principles.

From the above reasoning it should be understood that a media file does not need to be assigned a geographical position when uploaded to the verification system 4 in order to determine whether it is geographically descriptive or not. The decision whether a media file is truly/sufficiently accurately indicative of a geographical position can be based on the guessed geographical positions $p_i$ alone.

As aforementioned, the guessed geographical positions $p_i$ with which the users associate a media file 3 may for example be indicated by the users by marking a position on a digital map which is presented to them on their user terminals 6. However, it should be appreciated that there are several ways in which a guessed geographical position $p_i$ may be indicated by the users and that the invention is not limited to any particular way of doing so.

For example, a text field into which the users are encouraged to enter a text string that is indicative of a geographical position may be displayed on the user terminals 6. The text strings entered may then be transmitted to the verification system 4 which can compare the text strings with text strings stored in the database 9, in which each text string is linked to a geographical position.

In a similar way, a list of text strings that are indicative of geographical positions (for example names of buildings or places, addresses etc.) may be displayed on the user terminals 6 in which case the users can make their guesses $p_i$ by marking the text string with which they associate the media file that is presented to them. Also in this case, the database 9 may comprise a database table linking each text string to a geographical position.

The verification system 4 may also be adapted to allow the users to indicate their guessed geographical positions $p_i$ of a media file that is presented to them by bringing their user terminals to the geographical position with which they associate the media file. For example, if the user terminals comprise a GPS receiver or is connected to a GPS receiver, the guessed geographical positions $p_i$ may be indicated by the users by transmitting their current GPS position to the verification system 4, either in form of true geographical coordinates, such as latitude and longitude, or in form of data indicative of the geographical coordinates.

Another possibility allowing users to indicate their guessed geographical positions $p_i$ of a media file by physically move themselves to the position that they would like to guess upon is to utilize existing knowledge of the physical location of access points to which user terminals may connect. If the verification system 4 is communicatively connected to a network to which user terminals may connect through geographically distributed wireless access points, the users may mark their guessed positions $p_i$ by connecting their user terminals to a wireless access point covering that location. As long as the geographical position of the access point is known by the verification system 4, or at least can be communicated to the verification system 4, it can be adapted to register the geographical position of the access point as the guessed geographical position $p_i$ of the media file. Typically, an access point in a network is assigned an identification number, such as a network cell-ID, which can be used to determine to which access point a user terminal is connected and hence the location of the user terminal. Different enhanced positioning systems exist where one or more base stations are utilized to calculate a position of a user terminal other than just using just a single network cell-ID. This method for indicating guessed positions $p_i$ is applicable in many different types of mobile communications networks although the user terminals 6 may have to be adapted to support communication with the different types of access points. For example, the method may be used in a GSM network with GPRS in which the access points normally are referred to as radio base stations, a W-CDMA network in which the access points normally are referred to as Node Bs, an LTE/SAE network in which the access points normally are referred to as enhanced Node Bs, a WiMAX network in which the access points normally are referred to as WiMAX base stations, or a wireless mesh network (WMN) in which the access points normally are referred to as Wi-Fi hotspots. Another type of access point which may be utilized is NFC (Near Field Communication) readers with IDs and position obtainable by the verification system 4.

The verification system 4 may be adapted to prioritize which of the media files 3 stored in the storage means 8 are to be evaluated by which users, and in which order they should be evaluated. This functionality is provided by the server-side application 10 which hence, together with the processing means 11 on which the application is run, serves as selection means 10, 11 for selecting which media file 3 should be transmitted to a certain user terminal 6 for verification and when it should be transmitted.

The priority scheme is governed by selection methods implemented as routines of the server-side application 10, which routines use the guessed positions $p_i$ received for the media files 3 as input parameters. The guessed positions $p_i$ already received by the verification system 4 for a specific media file 3 will hereinafter be referred to as the guessing history of that media file.

According to an aspect of the invention, the verification system 4 is adapted to select which media file(s) 3 should be transmitted to an available user based on a descriptiveness level factor (DLF) that is indicative of the geographical descriptiveness of each media file 3 and/or a verification system need factor (SNF) that is indicative of the number of times each media file 3 has been guessed upon and for how long time the media file 3 has been stored in the first storage means 8. The DLF and SNF factor will be described in more detail below.

According to another aspect of the invention, when a user is available for guessing, the verification system 4 is adapted to build a set of queues, hereinafter called a Media Queue Set, according to which the media files 3 stored in the storage means 8 are transmitted to the available user. This is done by carrying out the following steps:

Step 1) For a given media file and guessing history, calculate the DLF factor of the media file.

Step 2) For a given media file and guessing history, calculate the SNF factor of the media file.

Step 3) Use the DLF and SNF factors of the media files to build a Media Queue Set.

Step 4) Send media files 3 to the available user according to the order stipulated by the Media Queue Set.

The DLF factor is defined as the percentage of guessed positions $p_i$ that have been within a certain threshold range from the assigned position $P_a$ of the media file. This threshold range partitions the set of guesses into two sets, the "correct" guesses, C, and the "incorrect" guesses, I. Setting this threshold range to 100 meters would put all guesses that were within a hundred meters of the assigned position $P_a$ of the media file in the "correct" set. The DLF factor is thus simply defined as the number of correct guesses divided by the total amount of guesses, multiplied by one hundred. That is, the DLF factor of a media file is defined as $$DLF = \frac{N_C}{(N_C + N_I)} \times 100$$

where $N_C$ is the number of guessed positions $p_i$ that are within a certain threshold range from the assigned position $P_a$ of the media file, and $N_I$ is the number of guessed positions $p_i$ that are outside of that threshold range from the assigned position $P_a$ of the media file.

The SNF factor gives a relative measure of evaluation need from the server side, i.e. from the verification system's point of view. SNF is firstly determined based on which media files have been guessed on enough times to consider the media files to be sufficiently evaluated. This is done by defining an evaluation threshold in terms of number of guesses, $N_{guesses}$. If the number of guesses received for a particular media file is less than the evaluation threshold, the media file is considered insufficiently evaluated, whereas the media file is considered sufficiently evaluated if the number of guesses for the media file exceeds the evaluation threshold. If this threshold value is set to 100 guesses, then all media files that have not yet received 100 guesses are considered insufficiently evaluated.

The SNF factor is secondly determined based on the date and time that the media file was first stored in the verification system 4. More recently stored media files are considered to be in more need of evaluation.

To calculate a SNF factor for the media files, all media files considered for transmission to a user for verification are sorted according to the following criteria by the selection means 10, 11 of the verification system 4:

1) Whether the media files have been guessed on enough times to be considered sufficiently evaluated. Media files which have not (i.e. media files considered insufficiently evaluated) are put first at this sorting stage.

2) When the media files were put into the verification system 4, i.e. at what date and time they were first stored in the storage means 8 of the verification system 4. Newer (more recently stored) media files are put first at this sorting stage.

All media files are then assigned a SNF factor that is higher the closer to the top they are in the sorted list of media files produced using the above sorting criteria. That is, the media files in the sorted list are assigned descending SNF factors. For example, in a list of 15 media files, the media files may be assigned SNF factors 15 to 1, starting from the top of the list.

Based on the DLF and the SNF factors of the media files, a Media Queue Set can be derived according to the two following steps:

1) Partition the media files into groups based on DLF.

2) In each of the groups created in step 1, form a queue by sorting the media samples according to SNF.

The first step of partitioning the media files into groups based on DLF may for example be performed by creating the following groups:

| Group 1: | 0 ≤ DLF < 1 | ("Indeterminate Descriptiveness") |
| Group 2: | 1 ≤ DLF < 5 | ("Presumed Descriptiveness") |
| Group 3: | 5 ≤ DLF < 10 | ("Verified Descriptiveness") |
| Group 4: | 10 ≤ DLF < 20 | ("Significant Descriptiveness") |

| | | |
|---|---|---|
| Group 5: | 20 ≤ DLF < 50 | ("High Descriptiveness") |
| Group 6: | 50 ≤ DLF < 75 | ("Very High Descriptiveness") |
| Group 7: | 75 ≤ DLF ≤ 100 | ("Extreme Descriptiveness") |

That is, the media files having a DLF factor that is equal to or bigger than 0 and less than 1 are placed in Group 1, which group contains media files that are classified as having an "Indeterminate Descriptiveness", while the media files having a DLF factor that is equal to or bigger than 1 and less than 5 are placed in Group 2, which group contains media files that are classified as having a "Presumed Descriptiveness", and so on.

The media files in each of these groups are then arranged into a queue by sorting them in descending order based on the SNF factors of the media files, i.e. so that the media file with the highest SNF factor is placed first in the queue. These queues are herein referred to as Media Queues.

For example, if Group 4 contains 3 media files {file 1, file 2, file 3} having the SNF factors {12, 3, 5}, they are sorted so that the media file having a SNF factor of 12 is put first, the media file having a SNF factor of 5 is put second and the media file having a SNF factor of 3 is put third, i.e. they are sorted {file 1, file 3, file 2}. This forms a queue which is referred to as Media Queue 4 (since it consists of media files from Group 4). The other groups 1-3 and 5-7 are sorted in the same way and the seven Media Queues so formed are the queues constituting the Media Queue Set. The above example should not be construed in a limiting sense and is only given to facilitate description of the formation of a Media Queue Set. It should be appreciated that, e.g., the partitioning into groups based on DLF factors can be done in many different ways and that a Media Queue Set may comprise any number of Media Queues.

The Media Queue Set formed according to the above described principles may be used in different ways. Typically, when a user is available for guessing, the selection means 10, 11 of the verification system 4 selects the first media file in any of the Media Queues for transmission to the available user, i.e. the media file having the highest DLF factor in the respective Media Queues and hence a media file that is in great need of evaluation. The selection of from which Media Queue to send a media file to an available user may be based on various sub-criteria.

For example, the selection may be based on the assigned positions $P_a$ of the media files that are first in line in the respective Media Queues and the user's assumed knowledge of the surroundings of the assigned positions $P_a$. If the user is assumed to have a good knowledge of the surroundings of the assigned positions $P_a$ of the media files, a media file from any of the "middle Media Queues" is preferably selected for transmission to the user. A middle Media Queue should herein be interpreted as a queue containing media files having medium-high DLF factor values, thus having a geographical descriptiveness that is classified as vague as it is neither high nor low (e.g. Media Queue 4 in the above-described example). This selection criterion will assure that the users that are believed to be most qualified for guessing will be made to guess on the media files for which it is hard to establish whether they are geographically descriptive or not.

The user's assumed knowledge of a geographical area can be determined based on user input. For example, each user can be encouraged to state where he/she lives by marking a place on a map, whereupon this information can be transmitted to the verification system 4. In this case, a user can be assumed to have good knowledge of the surroundings of the assigned position $P_a$ of a media file if the assigned position $P_a$ is close to where the user lives.

According to another aspect of the invention, users can be encouraged to mark a geographical area on a digital map that is presented to them on their user terminals 6, whereupon only media files having an assigned position $P_a$ within this area are transmitted to the users for verification. In this case, the users can be assumed to have good knowledge of the surroundings of the assigned positions $P_a$ of the media files since rational users most likely would mark geographical areas with which they are familiar. This functionality may be implemented by means of a square frame which can be moved freely on top of a map displayed on the user terminals 6. The client-side application 15 can, for this purpose, be adapted to incorporate a map function using two different map layers of which one is a map system, such as Google Map Static API. Information about Google Map Static API can be found in, e.g., Static Maps API Developer's Guide (http://code.google.com/apis/maps/documentation/staticmaps, 2008-10-29). The other layer comprises the movable square frame with which the user can choose a guessing area for which he/she wants to guess on media files. In order for the verification system 4 to know what media files 3 to send to the user, the server-side application 10 of the verification system 4 and/or the client-side application 15 comprises algorithms for converting pixel coordinates to geographic coordinates. Once an area is selected by a user, the pixel coordinates of the square frame are converted to geographical coordinates defining a geographical area, whereupon all or some media files 3 having an assigned position $P_a$ within that area are transmitted to the user terminal for verification.

Figure 4:
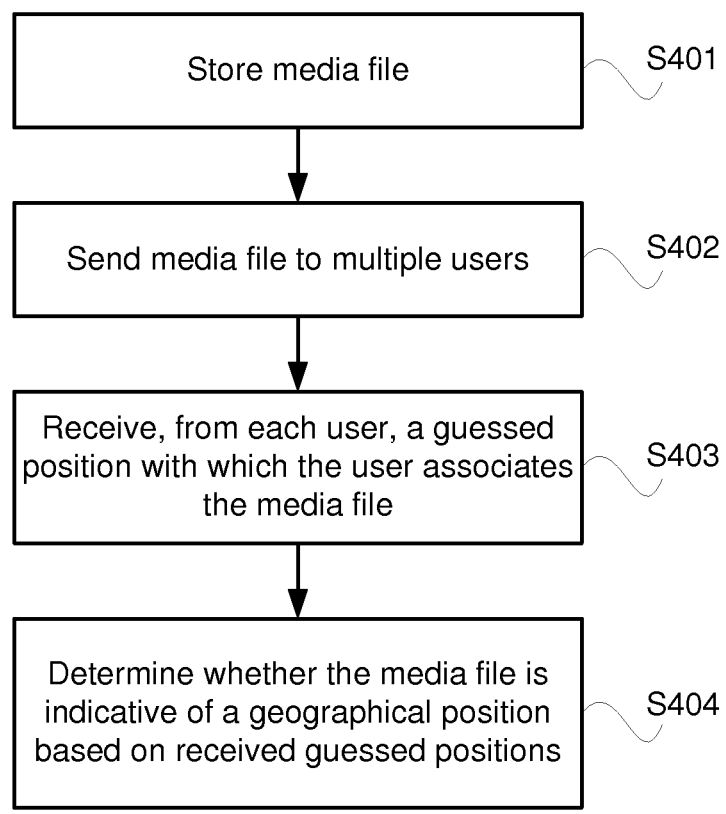
FIG. 4 shows a flow chart diagram illustrating a general method for verifying the geographical descriptiveness of a media file.

FIG. 4 shows a flow chart diagram illustrating a general method for verifying the geographical descriptiveness of a media file according to the invention. The method may be carried out by the exemplary verification system 4 illustrated in FIG. 2, to which simultaneous reference will be made when describing the method here below.

In step S401 a media file 3 whose geographical descriptiveness is to be verified is stored in the storage means 8 of the verification system 4. The method then proceeds to step S402.

In step S402 the media file 3 is transmitted to a plurality of user terminals 6 for verification, i.e. for verifying whether the media file is descriptive of a geographical position or not. The method then proceeds to step S403.

In step S403 the verification system 4 receives, from each of the plurality of user terminals 6, data indicating a guessed geographical position $p_i$ with which the user of the user terminal associates the media file 3. The method then proceeds to step S404.

In step S404 the verification system 4 determines whether the media file 3 is indicative of a geographical position based on the guessed geographical positions $p_i$ indicated by the data received from the plurality of user terminals 6 in step S403.

Figure 5:
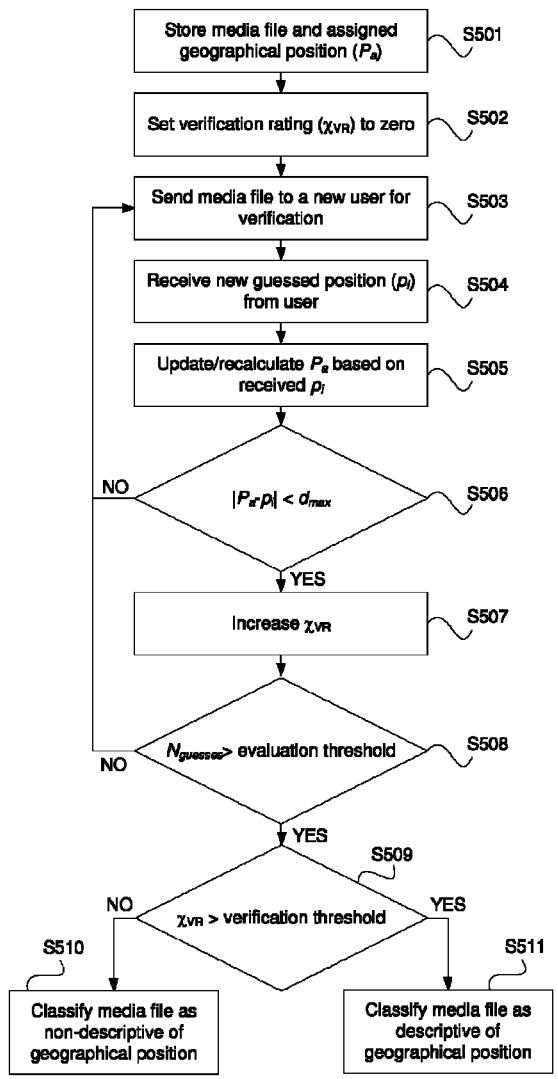
FIG. 5 shows a flow chart diagram illustrating a refined method for verifying the geographical descriptiveness of a media file.

FIG. 5 shows a flow chart diagram illustrating a refined method for verifying the geographical descriptiveness of a media file according to the invention. When describing the method, reference will again simultaneously be made to the exemplary verification system 4 in FIG. 2, which system may be adapted to carry out the method.

In step S501 a media file 3 and an initial value for the assigned position $P_a$ of the media file 3 are stored in the verification system 4. As described above, the initial value of the assigned position $P_a$ may for example be a claimed position $P_c$ stated by a user 6 uploading the media file 3 to the verification system 4 or to the first guessed position $p_i$ received for the media file 3. The method then proceeds to step S502.

In step S502, the verification rating $\chi_{VR}$ of the media file 3 is set to zero, whereupon the method proceeds to step S502.

In step S503, the media file 3 is transmitted from the verification system 4 to the user terminal 6 of a new user for verification. The method then proceeds to step S504.

In step S504 a guessed geographical position $p_i$ with which the user of the user terminal 6 associates the media file 3 is received by the verification system 4, whereupon the method proceeds to step S505.

In step S505, the assigned position $P_a$ of the media file 3 is updated/recalculated based on the guessed positions $p_i$ of the media file 3 received up to that point. The assigned position $P_a$ of the media file 3 can be recalculated as the average position $P_{av}$ of all received guessed positions $p_i$ for the media file 3, or as the average position of the received guessed positions $p_i$ with outliers and/or clusters removed, as described above. The method then proceeds to step S506.

In step S506, the verification system 4 calculates the geographical distance between the new assigned position $P_a$ of the media file 3 calculated in step S505 and the new guessed position $p_i$ received in step S504. This distance is then compared to a threshold value $d_{max}$ indicating a maximum distance allowed between the guessed position $p_i$ and the assigned position $P_a$ in order for the guess to be classified as correct. If the distance exceeds the threshold value $d_{max}$ the guess is classified as incorrect whereupon the method returns to step S503 in which the media file is transmitted to a new user for verification. If, on the other hand, the distance between the guessed position $p_i$ and the assigned position $P_a$ is shorter than the threshold value $d_{max}$, the guess is classified as correct whereupon the method proceeds to step S507.

In step S507, the verification rating $\chi_{VR}$ of the media file 3 is increased. For example, the verification rating $\chi_{VR}$ can be increased with a number equal to 1 minus the distance between the guessed position $p_i$ and the assigned position $P_a$, divided by the maximum distance threshold value $d_{max}$. The method then proceeds to step S508.

In step S508, the verification system 4 counts the number of guesses $N_{guesses}$, i.e. the number of guessed positions $p_i$, received for the media file 3 from various user terminals 6. This can be done by, e.g., querying the database 9 how many data records (i.e. rows) related to this particular media file that are stored in the database table GUESSED POSITIONS 19 in FIG. 3, i.e. how many times the Media ID of this particular media file 3 occurs in the first column of this database table 19. The number of guesses $N_{guesses}$ received for the media file 3 is then compared to an evaluation threshold value. If the number of guesses $N_{guesses}$ is less than the evaluation threshold value, the geographical descriptiveness of the media file 3 is considered to be insufficiently evaluated and the method returns to step S503 in which the media file 3 is transmitted to a new user for verification. If, on the other hand, the number of guesses $N_{guesses}$ exceeds the evaluation threshold value, the method proceeds to step S509.

In step S509, the verification system 4 compares the verification rating $\chi_{VR}$ of the media file with a verification threshold value. If the verification rating $\chi_{VR}$ of the media file is below the verification threshold value, the method proceeds to step S510. If, on the other hand, the verification rating $\chi_{VR}$ of the media file exceeds the verification threshold value, the method proceeds to step S511.

In step S510, the verification system 4 classifies the media file as non-descriptive of a geographical position since the verification rating $\chi_{VR}$ of the media file is still low although many (more than the evaluation threshold value) guesses $p_i$ have been received for that particular media file. According to an aspect of the invention, the verification system 4, in this step, deletes the media file 3 that has been classified as non-descriptive from the storage medium 8 and all data records relating to that media file in the database 9.

In step S511, the verification system 4 classifies the media file as descriptive of a geographical position since the verification rating $\chi_{VR}$ of the media file is high. According to an aspect of the invention, the verification system 4, in this step, transmits the media file 3 that has been classified as descriptive to a node 25 (see FIG. 2) storing only high-quality media files (that is, in this context, only media files that are truly descriptive of a geographical position). Any data records stored in the database 9 in the verification system 4 and relating to that media file may also be transmitted to the node 25 to be stored in a high-quality media database 26 in that node. At least some of the data stored in the database table MEDIA 18 (see FIG. 3), such as the media type and the assigned position $P_a$ of the media file, is preferably copied to the database 26. When the media file and the relevant data have been transmitted to the node 25, the verification system 4 can be adapted to delete the media file and all data records relating to that media file in the database 9.

The proposed principle of verifying geographical descriptiveness according to the invention can hence be used to filter out geographically descriptive media files from non-geographically descriptive media files. According to an aspect of the invention, the filtering-out of non-descriptive media files is used to minimize storage requirement in a system storing media files that are intended to be geographically descriptive. An example of a system storing media files that are intended to be geographically descriptive is a web server hosting a media-labeled map application.

Figure 6A:
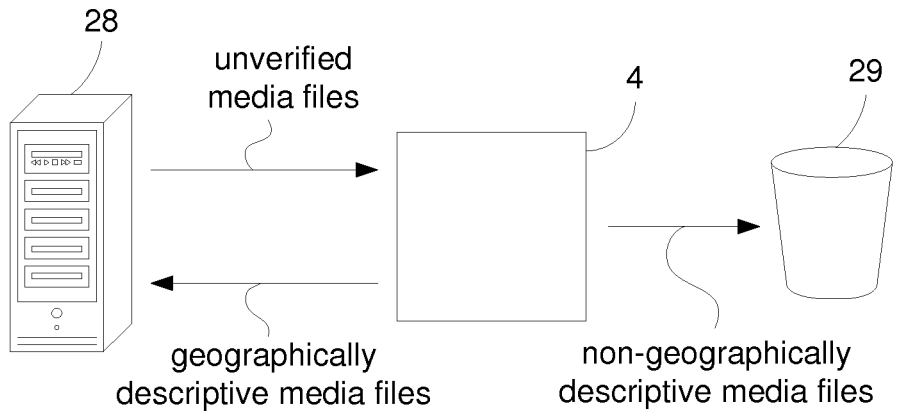
FIGS. 6A and 6B illustrate exemplary use cases of the verification system illustrated in FIG. 2.
Figure 6B:
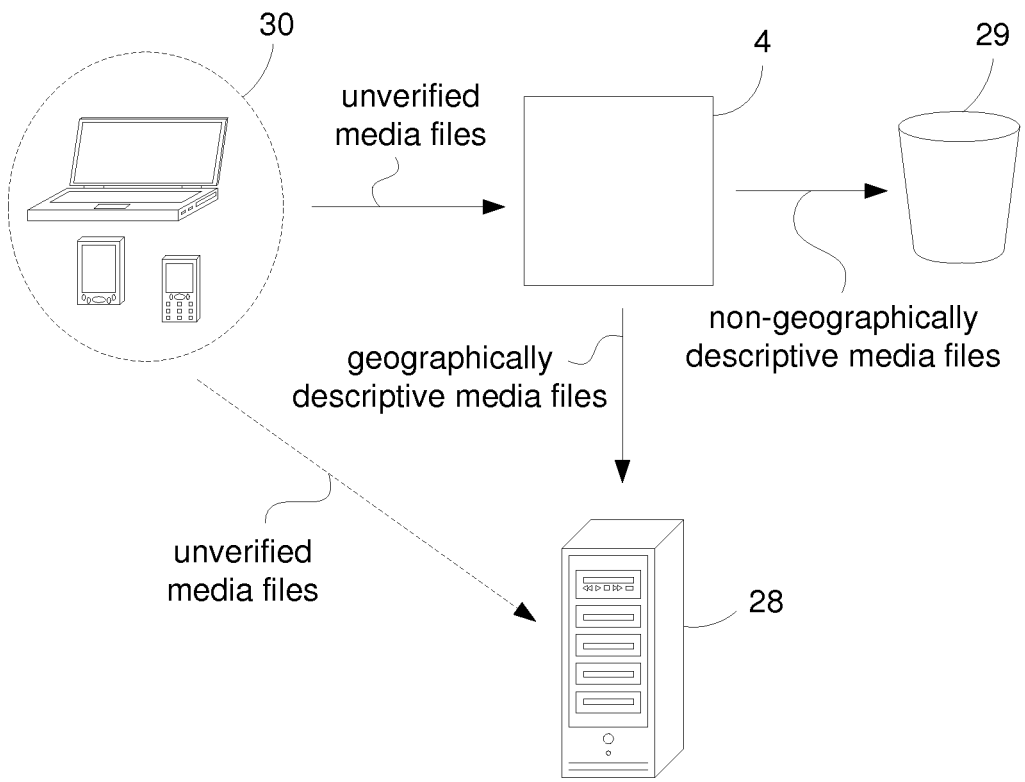

FIGS. 6A and 6B illustrate how the verification system 4 according to the invention can be used to minimize storage requirement in a map-application server 28 hosting a media-labeled map application. As illustrated in FIG. 6A, the server (map-application server) 28 may temporarily store a large number of unverified media files (i.e. media files whose geographical descriptiveness is unknown) whereupon they are transmitted to the verification system 4. The verification system 4 determines whether the media files are geographically descriptive according to the above described principles and each media file that is found to be descriptive is re-transmitted to the map-application server 28 for permanent storage, while the media files that are found non-descriptive are discarded (illustrated here by sending the non-descriptive media files to a bin or garbage can 29). This way, only media files that are considered as truly descriptive of a geographical position by the verification system 4 is permanently stored in the map-application server 28.

As mentioned in the background portion of this document, it is desirable to involve end-users in the process of generating media files that can be used in media-labeled map applications. FIG. 6B illustrates how the verification system 4 can be used to avoid even temporary storage of unverified media files in the map-application server 28. Instead of designing the system architecture such that media files generated by end-users 30 are transmitted directly to the map-application server 28 (illustrated by the dashed line in the drawing), the user-generated media files are first transmitted to the verification system 4. The verification system 4 then forwards only the media files that are found to be descriptive to the map-application server 29 while the non-descriptive media files are discarded. This scenario corresponds to the scenario described above with reference to FIG. 5, in which the verification system 4 forwards media files that are found to be geographically descriptive to a node 25 (see FIG. 2) for storing highly-descriptive media files.

A media-labeled map application typically requires a huge storage capacity due to the large number of media files that must be stored in order for the application to be useful. The proposed method renders possible identification of non-descriptive media files that otherwise would occupy valuable storage space in the map-application server 28 without adding value to the media-labelled map application since they are not descriptive of the geographical position to which they are assigned. Thus, the proposed method reduces the storage requirements of the map-application server 28 and increases usability of the media-labeled map application since non-descriptive media files presented to application users would cause confusion and irritation.

That is, the invention also provides a method for reducing storage requirements in a system or server 25, 28 for acquiring user-generated media files 3, such as pictures 3*a*-3*b*, which media files are descriptive of geographical positions. This method comprises the steps of receiving a media file 3 from a user terminal 7, 30;
sending the media file to a plurality of user terminals 6;
receiving, from each of said user terminals 6, data indicating a guessed geographical position $p_i$ with which the user of each user terminal 6 associates said media file 3;
determining whether said media file 3 is indicative of a geographical position based on said guessed geographical positions $p_i$, and
if the media file 3 is not descriptive of a geographical position:
discarding the media file 3, whereas
if the media file 3 is descriptive of a geographical position:
storing the media file within the system 25, 28.

The filtering-out of non-descriptive media files also reduces bandwidth requirements when the media-labeled map application is implemented as a network application since less media files need to be transmitted to the user terminals using the application. If a user of a media-labeled map application chooses to study, e.g., the map portion shown in FIG. 1, i.e. the city centre of Stockholm, this method ensures that only the media files 3*a*-3*g* that are truly descriptive of a geographical position within the map is transmitted to the user terminal for display. If user-generated media files which erroneously were alleged to be indicative of geographical positions within the map by the users uploading them also would be presented to the user of the media-labeled map application, the bandwidth requirements of the network would be increased.

The proposed method for verifying geographical descriptiveness of media files is dependent on guessed positions $p_i$ received from users. As aforementioned, it may also be desired to involve the users in the generation and submission of new media files. There are several ways in which the public (i.e. potential users) can be encouraged to participate in these processes.

One way to get the public to participate in the verification procedure is to give them access to a desired web service only if they first guess the location for some media files that are presented to them. For example, a user that wants to gain access to an online media-labeled map application may be asked to guess the locations for some media files before being granted access to the service or site.

Another way to encourage the public to participate in the verification procedure is to announce an online guess-the-location competition offering competitors tempting rewards by guessing the locations associated with media files presented to them.

Yet another possibility to get the public to generate and submit descriptive media files and/or to verify the geographical descriptiveness of media files by guessing, is to invite them to play a game in which the proposed method for verifying geographical descriptiveness of media files is used. Such a game will hereinafter be referred to as a verification game.

An exemplary embodiment of a verification game will now be described with simultaneous reference to FIGS. 2, 3 and 7. According to this exemplary game, users compete against each other by uploading media files 3 from their user terminals 6 to the verification system 4 and/or by trying to guess the locations associated with media files 3 uploaded by other users. The users get points (scores) based on the accuracy of their guesses $p_i$ and/or the verification rating $\chi_{VR}$ of any media files they have been uploading to the verification system 4. FIG. 7 shows an example of some database tables 21-24 which together with the database tables 18, 19 shown in FIG. 3 may be used by the database 9 of the verification system 4 to keep track of the user scores. The score of each user (each User ID) is seen to be stored in the right-most column of a database table 21 named USERS, which further comprises user-related information such as the name and contact information of each user. Database table 22 named GUESS MADE BY keeps track of which guessed position $p_i$ is received from which user. This is achieved by linking each Guess ID (see database table GUESSED POSITIONS in FIG. 3) to a User ID. Database table 23 named MEDIA UPLOADED BY keeps track of which media file is uploaded by which user. This is seen to be achieved by linking each Media ID (see database table MEDIA in FIG. 3) to a User ID. The last database table 24 named USER SESSION is used to keep track of the users currently playing the game and which IP address is used by the user during this particular session. This database table 24 may be established by letting the users login to the game by stating a user name and a password identifying the user (User ID), and link the User ID to the IP address from which the user logged in. User names and passwords may, although not shown in FIG. 7, be stored in the database table USERS 21 in which they can be linked to the User IDs.

The above described database structure allows the verification system 4 to continuously keep track of the user scores and recalculate the score for each user each time the user guesses the position $p_i$ for a media file that is presented to him/her, and/or each time another user guesses the position $p_i$ for a media file that was uploaded by the user.

For example, a user's total score may, at each given point in time, correspond to the sum of the current verification ratings $\chi_{VR}$ of all media files uploaded by that user, plus the points the user have earned so far by guessing the positions $p_i$ of other media files. The points that a user earns for guessing a position $p_i$ of a media file can, for example, be calculated in accordance with the exemplary method for calculating the verification rating $\chi_{VR}$ of a media file described above. That is, the verification system 4 can, for each received guessed position $p_i$, be adapted to first calculate the geographical distance between the current assigned position $P_a$ of the media file and the guessed geographical position $p_i$. If the distance exceeds a maximum distance threshold value $d_{max}$, the guess is classified as incorrect and the user gets no points. If, on the other hand, the calculated distance between the assigned geographical position $P_a$ and the guessed geographical position $p_i$ is shorter than the maximum distance threshold value $d_{max}$, the guess is classified as correct and the current score of the user is increased with a number equal to 1 minus the distance between the guessed position $p_i$ and the assigned position $P_a$, divided by the maximum distance threshold value $d_{max}$. It should, however, be understood that there are numerous ways of calculating the user scores and that this is only an exemplary way of doing so. It should also be understood that the database 9 of the verification system 4 can be realized in many different ways and that the database tables 18-24 shown in FIGS. 3 and 7 are merely examples that are shown to facilitate description of the verification procedure according to the invention and description of a game in which players, with or without knowledge thereof, participate in the verification of geographical descriptiveness of media files.

According to an exemplary embodiment of the game, the user scores are used as virtual money, or are transformed to virtual money using a suitable algorithm. In this embodiment, each guess made by a user is associated with a cost which is withdrawn from the user's account of virtual money. If the guessed position $p_i$ is classified as correct, the user earns an amount of virtual money exceeding the cost of the guess. The difference between the potential earning of a correct guess and the cost of a guess will hereinafter be referred to as the reward of a guess.

Preferably, the costs (risks) and rewards for guesses on different media files are set by the verification system 4 so as to control user behaviour in a way that optimizes the evaluation of the geographical descriptiveness of the media files. For example, the costs and rewards for guesses on different media files can be set to encourage users that are believed to be most qualified to guess on the media files for which it is hard to establish whether they are geographically descriptive or not, i.e. on the media files having a medium-high DLF factor. This may be achieved by performing the following steps when a user is available for guessing:

Step 1) Partition and sort all available media files to form a Media Queue Set as previously described.

Step 2) Create a media file selection group comprising the media files that are first in each of the so formed Media Queues (i.e. the media files having the highest SNF factor in each Media Queue).

Step 3) Set the costs and rewards for the media files in the selection group so that they are the lowest for the media files from the first and the last Media Queues (i.e. the Media Queues containing media files having the lowest and the highest DLF factor values, respectively) and then incrementally increase the costs and rewards for the media files from the other Media Queues according to a pyramid-shaped distribution so that the cost and reward becomes the highest for the media file from the middle Media Queue (i.e. the Media Queue containing media files having medium-high DLF factor values).

Step 4) Let the user select which media file from the selection group to guess on based on the costs and rewards for the media files and the geographical areas to which the media files are assigned (hereinafter referred to as guessing areas).

A geographical area to which a media file is assigned is any geographical area within which the assigned position $P_a$ of the media file is found. The guessing areas should be big enough not to give away the exact assigned positions $P_a$ of the media files but still sufficiently small in order for the user to get an idea of whether he/she is familiar with the guessing area or not. For example, if the assigned position $P_a$ of a media file is a position in Trafalgar Square in London, a suitable guessing area would be for example England, London, or West End.

The costs and rewards for the media files in the selection group are preferably displayed to the users on their user terminals 6 in text while the guessing areas may be displayed in text or by a map showing the guessing area. In case of the latter, the map is preferably the map on which the user should mark the guessed position $p_i$ of the media file if he/she chooses to guess on that particular media file.

The effects of the above-described steps are that a rational user would chose to guess on a media file for which the cost (and the reward) is low if the user is unfamiliar with the guessing area. If, on the other hand, the user is familiar with the guessing area, he/she would choose to guess on a high-risk-reward media file. This is beneficial in that media files having either very high or very low DLF factor values, i.e. media files for which it is very easy to determine whether they are descriptive or not, are being guessed on by less qualified users. In the same way media files having medium-high DLF factor values, i.e. media files for which it is difficult to determine whether they are descriptive or not, are being guessed on by highly qualified users. Thus, while the proposed principle of partitioning and sorting the media files 3 into a Media Queue Set assures that media files that are in great need of evaluation (i.e. media files having a low SNF factor) are prioritized when determining which media file(s) to send to an available user, the proposed principle for setting costs and rewards for the media files based on which Media Queue they belong to increases the probability that the users that are most qualified will guess on the media files whose geographical descriptiveness is the hardest to evaluate.

The verification system 4 can also be adapted to offer users to play other verification games or other variants of the above-described verification game in order to make them participate in the verification of geographical descriptiveness of media files.

Another example of such a verification game is a game which is played as follows:

When the game starts, the players take turns marking different locations on a digital map that is presented to them. These locations are not revealed to the other players.

When everyone has marked a location, the players take turns trying to describe their locations by uploading media files that are believed to be indicative of the location, such as texts, photos, audio clips and video clips, etc. to the verification system 4.

The media files that are uploaded by a user to describe his/her marked location are then presented to the other players, whereupon the other players try to guess the location by marking it on a map that is presented to them on their user terminals.

Players are then given scores based on both their ability to describe their own locations and their ability to guess others.

By implementing the proposed method in a game and adapt the verification system 4 to filter out media files that are found to be non-descriptive in any of the ways described above, the public can be made to (automatically) generate a database 9, 26 holding only high-quality media files which all are truly descriptive of a geographical position while having fun. The game itself is hence a verification tool utilizing the proposed method for verifying geographical descriptiveness of media files.

A database storing geographically descriptive media files is not only useful for media-labeled map applications. Media files that are descriptive of geographical positions man be beneficially used in various applications. For example, real estate firms listing available objects on their websites may use such a database to give potential buyers more detailed information about the surroundings of an object of interest. This may be achieved by querying the database to retrieve all media files that are descriptive of locations in the immediate surroundings of the object of interest, and presenting those media files to the potential buyer.

It should be understood that the proposed method may be used also for other purposes than obtaining a large database of geographically descriptive media files. For example, it can be beneficially used in an online where-is-this-photo-taken application in which a user can upload a photo to a web server and ask visitors of a website to guess the geographical origin of the photo. Based on the correspondence of the acquired guesses one would be able to say that the photo is taken at a particular location with a certain degree of certainty.

The proposed method can also be used for verifying map drawings. If a sudden change in geographical environment occurs in a geographical area, there might be a need for updating maps depicting that area. The proposed method can be used to verify the accuracy in a user-suggested correction of a map as follows:

When a user discovers an error in a map he/she can mark its position and get (extract) that part of the map.

The user then draws corrections on the extracted map portion and uploads it to the verification system 4.

The corrected map portion is transmitted and presented to several other users. The original position of the map portion is not presented to these users.

The other users verify the corrections by marking the geographical position with which they associate the (corrected) map portion on a larger map.

Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for verifying geographical descriptiveness of a media file, the method comprising:
storing, in a first storage medium, a media file and data indicating an assigned geographical position for the media file;
sending said media file to a plurality of user terminals;
receiving, from each of the plurality of user terminals, data indicating a guessed geographical position with which the user of that user terminal associates said media file;
updating the assigned geographical position for the media file based on the guessed geographical positions received from each of the plurality of user terminals; and
determining whether said media file is indicative of a geographical position by:
either comparing the assigned geographical position with each guessed geographical position, or comparing the guessed geographical positions with one another; and
calculating a verification rating for the media file based on said comparison, the determination as to whether or not the media file is indicative of a geographical position being based on said verification rating, wherein the verification rating value is recalculated each time data indicating a guessed geographical position is received, the verification rating being recalculated as follows:

if $|P_a - p_i| > d_{max} \Rightarrow \chi_{VR}(\text{updated}) = \chi_{VR}$, else $$\chi_{VR}(\text{updated}) = \chi_{VR} + \left(1 - \left(\frac{|P_a - p_i|}{d_{max}}\right)\right),$$

where $P_a$ is the assigned geographical position of the media file, $p_i$ is the latest received guessed geographical position, $|P_a - p_i|$ is the geographical (Euclidean) distance between the assigned geographical position and the latest received guessed geographical position, $d_{max}$ is a threshold value for the maximum distance allowed between the assigned geographical position and the latest received guessed geographical position in order for the guess to be classified as correct, $\chi_{VR}$ (updated) is the new verification rating of the media file, and $\chi_{VR}$ the verification rating of the media file prior to the reception of the latest received guessed geographical position.

2. The method according to claim 1, wherein said determining comprises determining that said media file is indicative of a geographical position if said verification rating exceeds a predetermined threshold value.

3. The method according to claim 1, wherein said comparing comprises comparing the guessed geographical positions with one another, and wherein said calculating comprises calculating the verification rating based on the correspondence of said guessed geographical positions.

4. The method according to claim 1, wherein the media file is received from a user terminal together with data indicating a claimed geographical position of which the media file allegedly is indicative, said claimed geographical position being used as at least an initial value for said assigned geographical position.

5. The method according to claim 1, wherein the first guessed geographical position received from said user terminals is used as at least an initial value for said assigned geographical position.

6. The method according to claim 1, further comprising updating the assigned geographical position by recalculating the assigned geographical position each time data indicating a guessed geographical position is received.

7. The method according to claim 6, further comprising storing the data indicating guessed positions received from the user terminals, and recalculating the assigned geographical position for each received guess as the position P minimizing the sum:

$$\sum_{i=1}^{i=N} |P - p_i|,$$

where $|P - p_i|$ is the geographical (Euclidean) distance between the position P and the position of the received guess $p_i$, and N is the total number of guessed geographical positions for the media file.

8. The method according to claim 1, wherein the method is implemented in a game in which the users of the user terminals participate, and wherein the users are given scores based on the difference between their guessed geographical position and the assigned geographical position of the media file.

9. The method according to claim 8, wherein the media file is uploaded from a user terminal, the score of the user of said user terminal also being based on the verification rating of said uploaded media file.

10. The method according to claim 1, wherein a plurality of media files are stored in said first storage medium, and wherein the method further comprises selecting which of said plurality of media files should be sent to a user terminal, the selection being based on the assigned geographical positions of the media files.

11. The method according to claim 10, further comprising receiving, from a user terminal, data indicating a geographical area which the user of said user terminal has selected, selecting, from said plurality of media files, at least one media file having an assigned geographical position within said geographical area, and sending said at least one media file to said user terminal.

12. The method according to claim 1, wherein a plurality of media files are stored in said first storage medium, the method further comprises selecting which of said plurality of media files should be sent to a user terminal, the selection being based on a factor that is indicative of at least one of the geographical descriptiveness of each media file and a factor that is indicative of the number of times each media file has been guessed upon and for how long time the media file has been stored in the first storage medium.

13. The method according to claim 1, further comprising removing the media file from said first storage medium if said media file is determined not to be indicative of a geographical position.

14. The method according to claim 1, further comprising moving the media file to a second storage medium intended to store only media files that are descriptive of geographical positions if said media file is determined to be indicative of a geographical position.

15. A system for verifying geographical descriptiveness of a media file, wherein the system comprises:
a storage medium configured to store a media file and data indicating an assigned geographical position of the media file;
a communication circuit configured to send said media file to a plurality of user terminals, and to receive, from each of the plurality of user terminals, data indicating a guessed geographical position with which the user of that user terminal associates said media file; and
a calculation circuit configured to update the assigned geographical position for the media file based on the guessed geographical positions received from each of the plurality of user terminals, determine whether said media file is indicative of a geographical position by either comparing the assigned geographical position with each guessed geographical position, or comparing the guessed geographical positions with one another, and by calculating a verification rating for the media file based on said comparison, the determination as to whether or not the media file is indicative of a geographical position being based on said verification rating, wherein the calculation circuit is configured to recalculate the verification rating value each time data indicating a guessed geographical position is received, and wherein the calculation circuit is configured to recalculate the verification rating as follows:

if $|P_a - p_i| > d_{max} \Rightarrow \chi_{VR}(\text{updated}) = \chi_{VR}$, else $$\chi_{VR}(\text{updated}) = \chi_{VR} + \left(1 - \left(\frac{|P_a - p_i|}{d_{max}}\right)\right),$$

where $P_a$ is the assigned geographical position of the media file, $p_i$ is the latest received guessed geographical position, $|P_a - p_i|$ is the geographical (Euclidean) distance between the assigned geographical position and the latest received guessed geographical position, $d_{max}$ is a threshold value for the maximum distance allowed between the assigned geographical position and the latest received guessed geographical position in order for the guess to be classified as correct, $\chi_{VR}$ (updated) is the new verification rating of the media file, and $\chi_{VR}$ is the verification rating of the media file prior to the reception of the latest received guessed geographical position.

16. The system according to claim 15, wherein said calculation circuit is configured to determine that said media file is indicative of a geographical position if said verification rating exceeds a predetermined threshold value.

17. The system according to claim 15, wherein said calculation circuit is configured to compare the guessed geographical positions with one another, and to calculate the verification rating based on the correspondence of said guessed geographical positions.

18. The system according to claim 17, wherein the communication circuit is configured to receive the media file from a user terminal together with data indicating a claimed geographical position of which the media file allegedly is indicative, and wherein the calculation circuit is configured to use said claimed geographical position as at least an initial value for said assigned geographical position.

19. The system according to claim 18, wherein the calculation circuit is configured to use the first guessed geographical position received from said user terminals as at least an initial value for said assigned geographical position.

20. The system according to claim 15, wherein the calculation circuit is configured to update the assigned geographical position by recalculating the assigned position each time data indicating a guessed geographical position is received.

21. The system according to claim 20, wherein the storage medium is configured to store the data indicating guessed positions received from the user terminals, and wherein the calculation circuit is configured to recalculate, for each received guessed geographical position, the assigned position as the position P minimizing the sum $$\sum_{i=1}^{i=N} |P - p_i|$$

where $|P - p_i|$ is the geographical (Euclidean) distance between the position P and the guessed geographical position $p_i$, and N is the total number of guessed geographical positions for the media file.

22. The system according to claim 15, wherein the calculation circuit is configured to calculate a score for the users of the user terminals based on the difference between their guessed geographical position and the assigned geographical position of the media file, the system thus being used as a game server to which users connect their user terminal to participate in a game in which they are given scores based on the accuracy of their guesses.

23. The system according to claim 22, wherein the calculation circuit is configured, when the media file is uploaded from a user terminal, to calculate a score for the user of said user terminal that is based also on the verification rating of said uploaded media file.

24. The system according to claim 15, wherein the system is configured to select one or more media files from a plurality of media files stored in the storage medium for sending to a user terminal, selecting the one or more media files based on the one or more assigned geographical positions of those media files.

25. The system according to claim 24, wherein the communication circuit is configured to receive, from a user terminal, data indicating a geographical area which the user of said user terminal has selected, wherein the system is configured to select, from said plurality of media files stored in the storage medium, at least one media file having an assigned geographical position within said geographical area, and wherein the communication circuit is configured to send said at least one selected media file to said user terminal.

26. The system according to claim 15, wherein the system is configured to select one or more media files from a plurality of media files stored in the storage medium for sending to a user terminal, the selecting being based on at least one of:
a factor that is indicative of the geographical descriptiveness of each media file; and
a factor that is indicative of the number of times each media file has been guessed upon and for how long time the media file has been stored in the storage medium.

27. The system according to claim 15, wherein the system is configured to remove the media file from said storage medium if said media file is determined not to be indicative of a geographical position by the calculation circuit.

28. The system according to claim 15, wherein the system is configured to move the media file to a different storage medium configured to store only media files that are descriptive of geographical positions, if said media file is determined to be indicative of a geographical position by the calculation circuit.

29. A computer program product comprising a non-transitory computer readable medium storing computer readable code that, when executed by a processor in a system comprising a storage medium storing at least one media file and data indicating an assigned geographical position of the media file and a communication circuit through which said system can communicate with user terminals connected thereto, causes the system to verify geographical descriptiveness of the media file, the computer readable code causing the system to:
send said media file to a plurality of user terminals;
receive, from each of the plurality of user terminals, data indicating a guessed geographical position with which the user of that user terminal associates said media file;
update the assigned geographical position for the media file based on the guessed geographical positions received from each of the plurality of user terminals; and
determine whether said media file is indicative of a geographical position by:
either comparing the assigned geographical position with each guessed geographical position, or comparing the guessed geographical positions with one another, and
calculating a verification rating for the media file based on said comparison, the determination as to whether or not the media file is indicative of a geographical position being based on said verification rating, wherein the verification rating value is recalculated each time data indicating a guessed geographical position is received, the verification rating being recalculated as follows:

$$\text{if } |P_a - p_i| > d_{max} \Rightarrow \chi_{VR}(\text{updated}) = \chi_{VR}, \text{ else}$$

$$\chi_{VR}(\text{updated}) = \chi_{VR} + \left(1 - \left(\frac{|P_a - p_i|}{d_{max}}\right)\right),$$

where $P_a$ is the of the media file, $p_i$ is the latest received guessed geographical position, $|P_a-p_i|$ is the geographical (Euclidean) distance between the assigned geographical position and the latest received guessed geographical position, $d_{max}$ is a threshold value for the maximum distance allowed between the assigned geographical position and the latest received guessed geographical position in order for the guess to be classified as correct, $\chi_{VR}$ (updated) is the new verification rating of the media file, and $\chi_{VR}$ is the verification rating of the media file prior to the reception of the latest received guessed geographical position.

* * * * *